June 8, 1926.
C. L. PAULUS ET AL
1,588,262
GUN MOUNT
Filed March 15, 1924
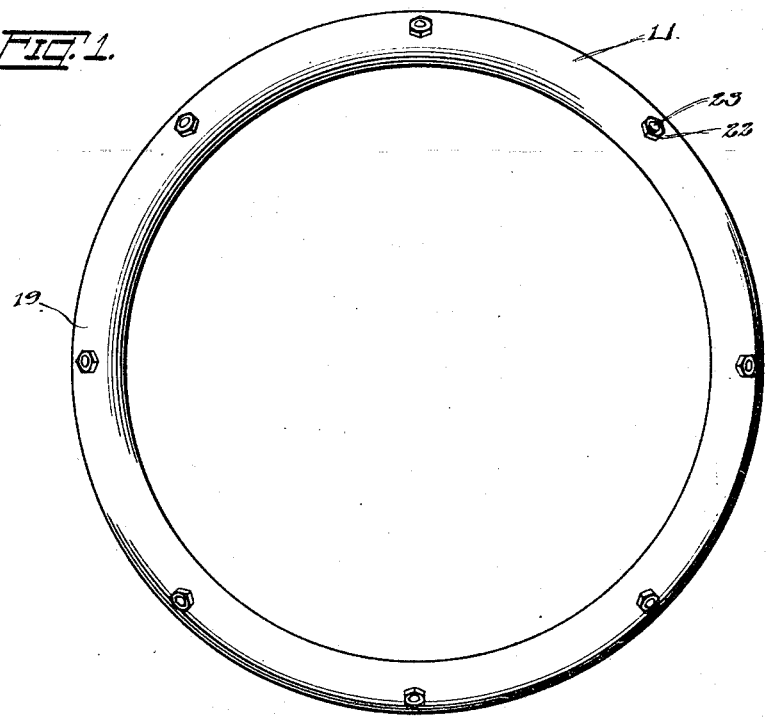
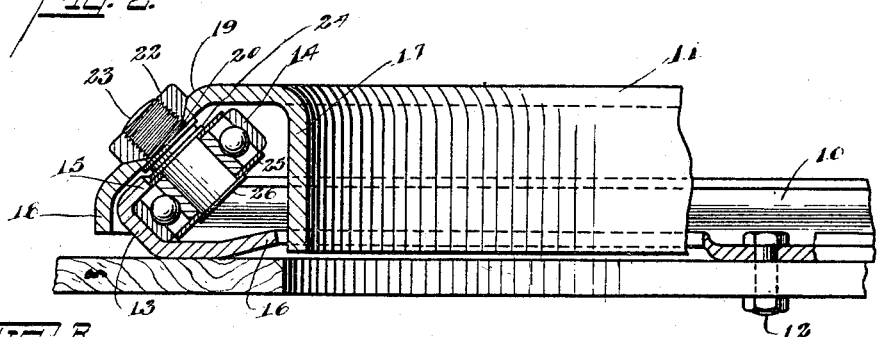
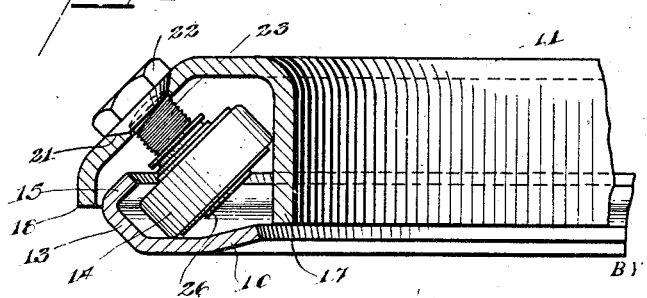
INVENTOR
Charles L. Paulus
Robert Kauch
BY Robert H Young ATTORNEY Patented June 8, 1926.

1,588,262

UNITED STATES PATENT OFFICE.

CHARLES L. PAULUS AND ROBERT KAUCH, OF DAYTON, OHIO.

GUN MOUNT.

Application filed March 15, 1924. Serial No. 699,855.

This invention relates to flexible gun mounts for use particularly on aircraft.

Generally, the invention has reference to a simple and compact rotary support of an economical and practical form which can be quickly and easily assembled and disassembled.

More specifically, the invention provides a flexible gun mount for airplanes capable of supporting large calibre guns to be trained in all directions, and comprises rings made of formed sheet metal instead of cast aluminum alloy or the like to make for cheapness, strength and long service, and wherein bearings are used which in the operation of assembling or disassembling the mount, remain assembled as units on one of the rings to facilitate matters. In former types of gun mounts, where the rings were cast, considerable difficulty arose through slight warpage, sudden shocks, or uneven strains, causing breakage, and furthermore, due to the construction, there was considerable difficulty in assembling and disassembling the mount because all of the bearings had to be assembled at the same time, were in no connected or easily assembled relation and certain parts thereof were concealed and it was difficult to locate and assemble the same.

In the drawing, illustrating our invention:

Fig. 1 is a plan view of a complete ring assembly for a flexible gun mount.

Fig. 2 is an enlarged sectional detail taken through one of the bearings.

Fig. 3 is a view similar to Fig. 2 indicating the manner of assembling and disassembling the gun mount.

The gun mount is located on the airplane fuselage over the gunner's cockpit from which position the gunner trains the piece in all directions. The gun is rigidly secured to the movable or training ring of the mount and may be moved mechanically to be trained in different directions, provision usually being made for fixing the movable ring to maintain a given setting of the gun when this is necessary or desirable.

In the drawing, the ring 10 is fixed and the ring 11 is movable. The fixed ring is secured to the fuselage suitably by bolts 12 or in any other desired manner. The rings 10 and 11 are both of formed sheet metal and channel-shaped to give maximum strength and enable the use of the mount with large calibre guns. The conformation of the rings as will presently be pointed out, is made to withstand the loading in any position of the gun, and to assume the shock of recoil likewise in any position of the piece.

The fixed ring 10 has the outer edge of the plain portion thereof turned up forming an obtuse angle with the plain portion to provide an annular flange 13, the inside of which provides a race-way for the roller bearings 14 mounted upon the ring 11. The outer edge of the flange 13 is bent inwardly approximately at right angles to form an annular lip 15, the inside of which provides a shoulder to assume the lateral thrust of the bearings 14 and to provide a means for holding the rings together in assembled relation when the bearings are drawn up in engagement therewith. To further strengthen the ring 10, the inner edge may be turned up slightly as shown at 16 in the form of an annular flange completing the channel-shaped cross section of the ring.

The ring 11 has a down-turned inner annular flange 17 and outer annular flange 18 providing in effect an inner and outer apron about the fixed ring 10 concealing the same and protecting the race-way and the bearings operating thereon against damage and accumulation of dirt. The flanges give a channel shape to the cross section of the ring 11, which makes for maximum strength. The flange 18 is in effect merely a lip turned in from the edge of the annular flange 19 bent at an obtuse angle with the plain portion of the ring 11 on the outer edge thereof. The flange 19 is perforated at regularly spaced intervals as at 20 and counterbored as indicated at 21 to receive the conical ends of the nuts 22 threading on studs 23 extending through the openings 20. The studs 23 are shouldered at 24 at the inner extremity of the threaded portion and extend through the inner races of the bearings 14 and washers 25 on either side of the bearings 14 and have their inner ends upset as shown at 26 to rivet the bearings as units on the studs. In this way, the bearings are movable bodily, inwardly and outwardly when the nuts 22 are backed on the studs as shown in Fig. 3, or turned up tight, as shown in Fig. 2. The bearings 14 clear the edge of the lip 15 when the nuts 22 are backed off the studs 23, as shown in Fig. 3. When all of the nuts 22 are loosened in this manner, the ring 11 may be removed from the ring 10 and all of the bearings will remain loosely assembled on the ring 11. This facilitates the matter of assembling as this involves merely the tightening up of the nuts 22 all around the ring and it is not necessary to locate and assemble loose parts concealed between the rings as was heretofore the case where the bearings were assembled in the assembling of the mount. When the nuts 22 are turned home all around the ring so that the bearings 14 are in position on the raceway 13 alongside the lip 15, the ring 11 is securely held in assembled relation with the ring 10. The bearings enable easy movement of the gun in any direction and in any position of the piece its weight and the load incident to the recoil is assumed in two planes due to the angular inclination of the race-way with the bearings operating thereon, the bearings being disposed at approximately 45° to both rings. This form of bearing further enables a very compact structure as will be appreciated from a study of Fig. 2 where the bearing is shown assembled as when in use, only sufficient spare room being necessary inside the rings for the backing of the bearings away from the race-way when disassembling the movable ring.

We claim:

1. In a rotary support for guns and the like, a pair of rings, and bearing means collectively enclosed by said rings and permanently carried in angular relation by one of said rings.

2. In a rotary support for guns and the like, a pair of rings, and bearing means collectively enclosed by said rings and permanently carried by one of said rings, and removable with said ring from the other ring when adjusted to a certain position.

3. In a rotary support for guns and the like, a pair of rings, and bearing means carried by and removable as a unit with one of said rings, constituting the means for holding said rings together when the same are assembled.

4. In a rotary support of the character described, a fixed ring having a race-way thereon and an adjacent shoulder, a movable ring having depending flanges on the inner and outer edges thereof to fit over said fixed ring, and bearing means adjustably and permanently mounted in one of said depending flanges arranged in one state of adjustment to ride on said raceway along said shoulder and hold said rings together.

5. In a flexible mount for guns and the like, a pair of rings, and bearing means adjustable on one of said rings arranged in one position to hold said rings together and to provide a rotary bearing between the rings, and arranged in another position to be out of holding relation to the rings and to be removable with the ring on which the same is adjustably mounted.

6. In a flexible mount for guns and the like, a fixed ring, a movable ring, one of said rings having an annular shoulder thereon, and bearing means adjustably mounted on the other ring engaging said shoulder in one position of adjustment to hold said rings together and provide a rotary bearing therebetween, and adjustable away from said shoulder to be removable with the ring whereon the same is mounted.

7. In a flexible mount for guns and the like, a pair of rings, one of said rings having an annular raceway flange extending upwardly at an angle from the outer edge, the outer edge of said flange being turned in to provide a lip, the other ring arranged facing the first ring having a downwardly extending annular flange, and bearing means adjustable on the last-mentioned flange arranged in one state of adjustment to engage on said race-way flange on the first mentioned ring behind the lip on the edge thereof.

8. In a flexible mount for guns and the like, a pair of rings, one of said rings having an annular race-way flange extending at an angle from the outer edge, the outer edge of said flange being turned in to provide a lip, the other ring arranged facing the first ring having a similarly extending annular flange, and bearing means adjustably carried on said flange arranged when tightly assembled thereon to be riding on said raceway with a portion disposed behind the lip on the edge thereof but when loosely assembled on said flange to be capable of movement past the said lip.

9. In a flexible mount of the character described, a pair of rings, one ring having an annular lip thereon, bearing means on the other ring adjustable in and out at an angle with reference to said first ring to move into operative position behind said lip on the first mentioned ring.

10. In a flexible mount of the character described, a pair of rings, one ring having an inwardly turned annular lip, bearing means mounted on the other ring adjustable in and out at an angle with reference to the first ring to move outwardly into holding operating position behind said lip and inwardly away from said lip to disassembling relation thereto.

11. In a flexible mount of the character described, a pair of rings, one ring having an annular lip thereon, studs adjustable in openings in the other ring at an angle with said first ring, and bearing means on the free end of said studs movable therewith into or out of operative position with reference to the lip on the first mentioned ring.

12. In a flexible mount of the character described, a pair of rings, one of said rings having an annular flange bent at an angle with the ring providing a bearing raceway, and an annular lip on said flange providing a shoulder, the second ring having an annular flange, studs projecting from said flange toward the first ring, and bearing means on said studs adjustable toward and away from the lip on said first-mentioned ring.

13. In a flexible mount of the character described, a pair of rings, one of said rings having an annular flange bent at an angle with the ring, providing a bearing raceway, and an annular lip on said flange providing a shoulder, the second ring having an annular flange, a plurality of studs having threaded ends projecting through openings in said flange, nuts on said studs permitting the adjustment of said studs with reference to said first ring, and bearing means on the end of said studs to operate on said raceway on said first ring behind the lip on the edge thereof arranged in one state of adjustment of said studs to be capable of movement inwardly to clear the edge of said lip.

14. In a flexible mount of the character described, a pair of rings, one ring having an angularly extending annular lip, bearing means mounted on the other ring adjustable angularly with reference to the first ring to move in one direction into holding operative position behind said lip in the reverse direction away from said lip to disassembling relation thereto.

15. In a flexible mount of the character described, a pair of rings, one of said rings having an angular shoulder on said flange defining the edge of said raceway, the second ring having an angularly extending annular flange, studs projecting through openings in said flange and having their free ends threaded, bearing means on said studs adjustable therewith in relation to said raceway, the openings in said flange being countersunk, and conefaced nuts threading on said studs and bearing in said countersunk openings.

16. In a rotary support of the character described, the combination of a lower fixed ring, an upper movable ring to be detachably mounted on the lower ring, bearings carried on studs on said upper ring capable of being tightened or loosened on the outside of said upper ring arranged when made tight to hold said bearings in an operative position, serving as antifriction means between said rings and to hold said rings together in assembled relation but when loosened permitting the removal of the upper ring from the lower ring with the bearings depending therefrom.

17. In a flexible mount for guns, a ring having an annular lip bent inwardly at an angle relative to said ring, a second ring facing the first ring, and having an annular flange bent at an angle thereto approximately parallel to said lip, and bearing means adjustably mounted on said flange to be arranged in a position behind said lip on said first ring.

18. In a flexible horizontal ring mount for guns and the like, the combination of a pair of channel shaped formed sheet metal rings having the flanges thereof facing, bearing means housed within the two rings when in operative relation and concealed by the flanges of said rings, and means for supporting said bearings in relation to the flanges of one of said rings on inclined axes for holding said rings together in assembled relation.

19. In a flexible mount for guns, a fixed lower ring, a movable upper ring and bearings angularly arranged between said rings mounted adjustably on said upper ring for holding said rings together when in operative position or for permitting the removal with said upper ring from operative position between said rings.

20. In a flexible mount for guns, the combination of a lower fixed ring, an upper rotatable ring and antifriction bearings means between said means arranged at an angle of approximately 45° to both of said rings.

21. In a flexible mount for guns, a ring having an angularly extending annular raceway and a limiting annular shoulder on the outer edge of said raceway, a second ring having bearing supports substantially at right angles to said raceway and bearings thereon to operate on said raceway.

22. In a flexible mount for guns, a ring having an angularly extending annular raceway and a limiting annular shoulder on the outer edge of said raceway, a second ring having bearing supports substantially at right angles to said raceway and bearings thereon to operate on said raceway, said bearings being adjustable relative to said supports in relation to said limiting shoulder whereby in one position to serve to hold said rings together when in operative relation to said raceway and when in another position serving to permit the removal of the ring supporting the bearings from the other ring.

23. In a flexible mount for guns, a fixed lower ring having a raceway extending at an angle approximately 45° to the horizontal, an upper movable ring having bearing supports arranged approximately at right angles to said raceway, and a plurality of bearings operating on said raceway at right angles thereto and having studs mounted in said bearing supports.

24. In a flexible mount for guns, a fixed lower ring having a raceway extending at an angle approximately 45° to the horizontal, an upper movable ring having bearing supports arranged approximately at right angles to said raceway, and a plurality of bearings operating on said raceway at right angles thereto and having studs mounted in said bearing supports, and means for holding said bearings against movement vertically or laterally off said raceway to hold said rings together in assembled relation.

25. In a flexible ring mount for aircraft guns and the like, the combination of a pair of channel shaped sheet metal rings arranged with their flanges facing, the lower ring being fixed and providing a raceway and a plurality of antifriction ball bearing rollers mounted on the upper movable ring to operate on said raceway, each of said rollers having washers thereon enclosing the space between the inner and outer races to encase a supply of lubricant in each of the individual bearings.

In testimony whereof we affix our signatures.

CHARLES L. PAULUS.
ROBERT KAUCH.